Jan. 12, 1937.  J. B. COOPER  2,067,477

GEARING

Filed March 20, 1931

Inventor
J. B. Cooper
by
Attorney

Patented Jan. 12, 1937

2,067,477

UNITED STATES PATENT OFFICE 2,067,477

GEARING

James B. Cooper, Phoenix, Ariz., assignor to Allis-Chalmers Manufacturing Company, Milwaukee, Wis., a corporation of Delaware Application March 20, 1931, Serial No. 524,060

4 Claims. (Cl. 74—466)

This invention relates to gearing of the type known as herring-bone in which there are two sets of teeth the teeth of one set being at an angle to the teeth of the other set and intersecting at points which lie in a circumferential line known as the apex of the gear.

The object of this invention is to provide a set of gears of the herring-bone type which will be free from vibration, chatter, noise and any inequality of operation that would cause quick wear and destruction of the gears.

It is believed that the ordinary herring-bone type of gear is so carefully constructed to be similar for each set of teeth that the most minute imperfection in gear cutting or a bur or a fin on the teeth or any rough spot or even an unequal distribution of gear grease across the face will tend to start this objectionable vibration. In the present invention the gear is so constructed that the two sets of teeth are designed to have unequal length if the angles of the individual teeth are the same; or the sets of teeth may be so constructed that when the angles are different the lengths of the teeth of the two sets may be either equal or unequal provided the unit pressure on the one set is different from the unit pressure on the other set; or the sets of teeth may be different in number of teeth per set where the angles of the teeth of the sets are the same and the length of the teeth are the same. In all cases the unit pressure on the one set of teeth will be different from the unit pressure on the other set of teeth.

In the drawing comprising a part of this specification, Figs. 1, 2, 3, and 4 are diagrammatic views in a radial direction indicating two of the teeth of a gear, each from one of the sets of teeth comprising the gear.

Fig. 1 appertains to a gear in which the teeth are of unequal length but the sets of teeth arranged at the same angle.

Fig. 2 appertains to a gear in which the teeth are of unequal length and the teeth of one set are at a different angle from the teeth of the other set.

Fig. 3 appertains to a gear in which the teeth of one set are equal in length to the teeth of the other set but the angle of one set of teeth is different from the angle of the other set of teeth.

Fig. 4 appertains to a gear in which while the length and angle of the teeth of one set are equal to those of the other set the number of teeth is different from one set over that of the other set.

Figure 1:
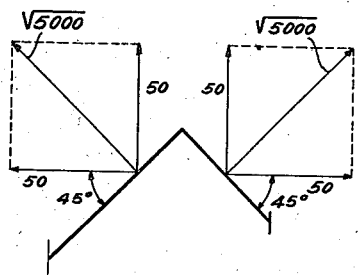
Figure 5:
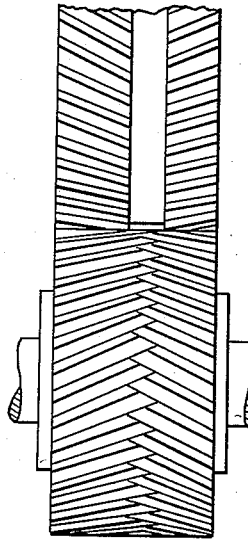
Fig. 5 is a view of the herring-bone gearing looking in a radial direction, the pinion being shown entire and the gear above being fragmentary, corresponding to the type shown in Fig. 1.
Figure 6:
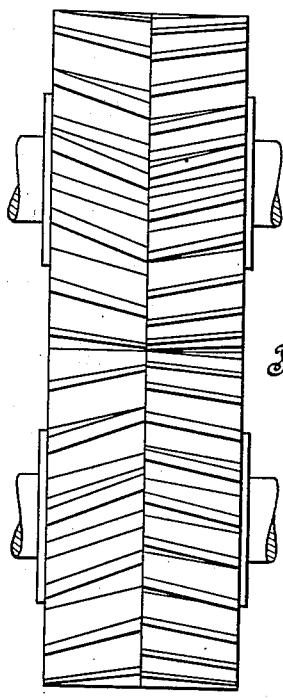
Fig. 6 is a similar view to Fig. 5 of a set of herring-bone gears corresponding to the type shown in Fig. 4.

The type shown in Figs. 1 and 5 corresponds to the ordinary herring-bone gearing in which one side of at least one of the two gears comprising the set is turned down so as to make the effective set on that side of less length axially than the set on the other side. In the diagram of Fig. 1 the axial forces are indicated as having a value of 50. The normal forces on the teeth on the two sides will also be equal and have a value of the square root of 5000 while the tangential force on the two sets will also be equal and have a value of 50. In this case it will be observed that the teeth of the set on the right of Fig. 1 being shorter will have a unit pressure greater than the unit pressure normal to the teeth of the other set.

Figure 2:
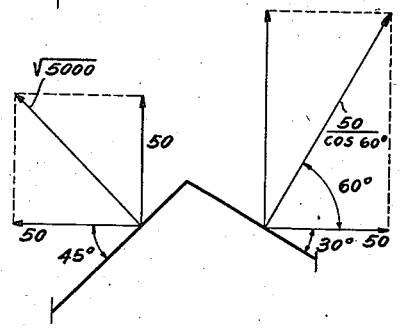

In the diagram of Fig. 2 the axial forces are again equal and assumed at a value of 50. The teeth are shown at an angle to the axis, on the right of 30 degrees and on the left of 45 degrees. Completing the diagram of forces it will be clear that the normal force on the teeth at the right will have the value of the quotient of 50 divided by the cosine of 60 degrees. The normal force on the teeth at the left will have the value as before, the square root of 5000. The greater normal force on the shorter teeth at the right will necessarily cause a greater unit force on the teeth at the right than the unit force on the teeth at the left. The tangential force on the right will also be greater than the tangential force on the left.

Figure 3:
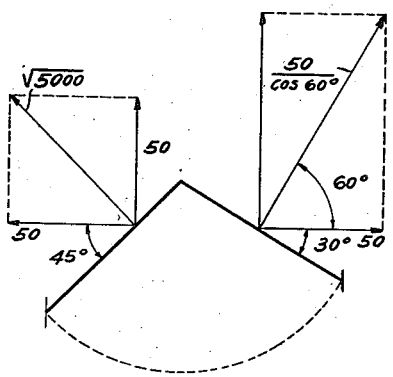

Referring to the type of Fig. 3 the teeth on the right are equal in length to the teeth on the left of this figure. The angle of the teeth on the right to the axis is 30 degrees while the angle at the teeth to the left is 45 degrees. The normal forces on the teeth and the tangential forces will be the same as in Fig. 2. Because the normal force on the right is of greater value applying to a tooth of equal length to the teeth on the left, the unit force on the right will be greater than the unit force on the teeth at the left.

Figure 4:
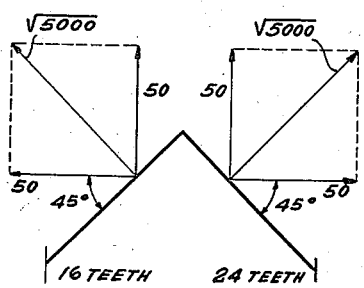

In the type shown in Fig. 4 the teeth are of equal length on both sides and are arranged at equal angles to the axis, in this case 45 degrees on each side. Normal force on the teeth at the right and also on the left will be equal and have a value of a square root of 5000. The tangential forces will also be equal to each other and have a value of 50. Because the number of teeth is greater on the right than on the left the unit force on the teeth at the left will be greater than the unit force on the teeth at the right.

It is difficult to explain the theory or reason for quiet action with absence of vibration of the gearing of this invention but it is believed to be due to the fact that in each case referred to the unit force normal to the teeth is higher on one side than the unit force on the other side.

It should be understood that it is not desired to limit the invention to the exact details of description shown and described, for obvious modifications may occur to persons skilled in the art.

It is claimed and desired to secure by Letters Patent:

1. The combination with a rotary drive member and a rotary driven member rotatable about parallel horizontal axes, of a gear train therebetween having a plurality of equal ratio simultaneously loaded substantially non-shiftable gear train portions between said members and comprising herringbone gears having teeth of the same helical angle, the teeth on opposite sides of at least one of said gears being of unequal length to provide noise reducing differential characteristics.

2. The combination with a rotary drive member and a rotary driven member rotatable about parallel horizontal axes, of a gear train therebetween having a plurality of equal ratio simultaneously loaded gear train portions between said members and comprising herringbone gears having teeth of the same helical angle, one of said gears being substantially non-shiftable, the teeth on opposite sides of at least one of said gears being of unequal length to provide noise reducing differential characteristics.

3. Gearing comprising a herringbone gear having teeth equally oppositely inclined to its axis and of unequal length, and a second herringbone gear meshing with said first gear to transmit rotary driving forces between them and the driver gear being subjected only to rotary forces whereby the driven gear is subjected only to end thrust developed by driving pressure between the oppositely inclined teeth.

4. Gearing comprising a herringbone gear having teeth equally oppositely inclined to its axis, and a second herringbone gear meshing with said first gear at different areas of contact to transmit rotary driving forces between them and the driver gear being subjected only to rotary forces, whereby different unit tooth pressures result between the oppositely inclined teeth.

JAMES B. COOPER.